(12) United States Patent
Matsui

(10) Patent No.: US 6,280,835 B1
(45) Date of Patent: Aug. 28, 2001

(54) THERMOPLASTIC ACRYLIC RESIN BRITTLE FILM

(75) Inventor: Etsuo Matsui, Yamanashiken (JP)

(73) Assignees: Asahi Kagaku Kogyo Co., Ltd.; Lintec Corporation, Tokyo, both of (JP)

( * ) Notice: Subject to any disclaimer, the term of this patent is extended or adjusted under 35 U.S.C. 154(b) by 0 days.

(21) Appl. No.: 09/261,851

(22) Filed: Mar. 3, 1999

Related U.S. Application Data

(63) Continuation-in-part of application No. 08/976,197, filed on Nov. 21, 1997.

(30) Foreign Application Priority Data

Dec. 20, 1996 (JP) .................................................... 8-354829

(51) Int. Cl.$^7$ ...................................................... B32B 27/30
(52) U.S. Cl. .......................... 428/220; 524/492; 524/494; 524/423; 524/437; 524/425; 524/493; 428/331; 428/328; 428/330; 428/343
(58) Field of Search .................................. 524/425, 492, 524/493, 494, 438, 445, 423, 437; 428/220, 331, 328, 330, 343, 520

(56) References Cited

U.S. PATENT DOCUMENTS

| | | | |
|---|---|---|---|
| 4,268,983 | 5/1981 | Cook | 40/2.2 |
| 4,477,620 | 10/1984 | Parish | 524/423 |
| 4,789,566 | 12/1988 | Tatsuno et al. | 427/388.2 |
| 5,051,298 | 9/1991 | Landry et al. | 428/220 |
| 5,160,768 | 11/1992 | Antoon, Jr. | 428/35.2 |

FOREIGN PATENT DOCUMENTS

| | | |
|---|---|---|
| 0 192 961 A1 | 1/1986 | (EP) . |
| 0 784 077 A1 | 7/1997 | (EP) . |
| 50-129195 | 10/1975 | (JP) . |
| 54-34420 | 10/1979 | (JP) . |
| 61-47426 | 10/1986 | (JP) . |
| 64-79237 | 3/1989 | (JP) . |

OTHER PUBLICATIONS

Database WPI, Section CH, Week 8521, Derwent Publications Ltd., Class A14, AN 85–126055 of JP 60 064 812A, Apr. 1985.

*Primary Examiner*—Samuel A. Acquah
*Assistant Examiner*—U. K. Rajguru
(74) *Attorney, Agent, or Firm*—Frishauf, Holtz, Goodman, Langer & Chick, P.C.

(57) ABSTRACT

A thermoplastic acrylic resin brittle film which has a tensile strength at break of 1.0 to 3.0 kg/mm$^2$ and an elongation at break of 2.0 to 20.0%, and is prepared from a resin composition which comprises (A) 100 parts by weight of a thermoplastic acrylic resin, (B) 10 to 70 parts by weight of a filler and, optionally, up to 30 parts by weight plasticizer. The filler can be (a) fused silica aggregates of particles having an average diameter of the particles in the range of 5 to 20 $\mu$m and diameters of the particles in the range of 0.5 to 100 $\mu$m, (b) aluminum hydroxide aggregates of particles having an average diameter of the particles in the range of 1 to 20 $\mu$m and diameters of the particles in the range of 0.2 to 50 $\mu$m, (c) barium sulfate aggregates of particles having an average diameter of the particles in the range of 1 to 20 $\mu$m and diameters of the particles in the range of 0.2 to 50 $\mu$m, and (d) calcium carbonate aggregates of particles having an average diameter of the particles in the range of 0.5 to 20 $\mu$m and diameters of the particles in the range of 0.1 to 50 $\mu$m.

17 Claims, No Drawings

THERMOPLASTIC ACRYLIC RESIN BRITTLE FILM

This is a Continuation-in-Part application of application Ser. No. 08/976,197 filed Nov. 21, 1997.

FIELD OF THE INVENTION

The present invention relates to a novel thermoplastic acrylic resin brittle film, and more particularly, to a thermoplastic acrylic resin brittle film which has excellent transparency and weatherability, can be formed into a thin film, is brittle and easily torn, and is advantageously used for labels and stickers, such as certificate stamps and sealing labels, and display stickers, such as marks for danger prevention and marks for commercial products, and also for prevention of forgery of passports.

Further, the present invention relates to a novel thermoplastic acrylic resin brittle film for laser marking. Additionally, the present invention relates to an adhesive sheet using the thermoplastic acrylic resin brittle film.

PRIOR ART OF THE INVENTION

Brittle films have heretofore been used as base films for labels which must be prevented from transfer, such as labels for theft prevention and labels of certificate stamps, by taking advantage of the property of the films, i.e., brittle and easily torn.

As the brittle film used for the above applications, various films, such as (1) a brittle film for marking which has a thickness of about 30 to 60 μm and comprises a resin composition containing 100 parts by weight of a vinyl chloride resin, about 5 to 20 parts by weight of an alkyl methacrylate resin, 5 to 30 parts by weight of a plasticizer, and pigments (Japanese Patent Publication No. Showa 54(1979)-34420), (2) a substantially transparent sheet having a layer composed of glass microspheres having a refractive index of 1.8 or more alone (Japanese Patent Application Laid-Open No. Showa 50(1975)-129195), and (3) a safety label using the above transparent sheet as the film which is brittle and easily torn (Japanese Patent Publication No. Showa 61(1986)-47426), have been proposed.

However, because the above brittle film for marking (1) is colored due to pigments, this film has drawbacks in that information placed under the film cannot be observed and recognized through the film, and that the film has insufficient brittleness, poor flexibility, and inferior fitting when the film is attached to curved surfaces. Moreover, a plasticizer must be used in combination because the film comprises a vinyl chloride resin, and the use of a plasticizer causes the possibility that adhesion of an adhesive material to the film becomes insufficient due to bleeding out of the plasticizer when the film is attached to an article through the adhesive material.

The above transparent sheet (2) and the above safety label (3) using the transparent sheet have drawbacks in that the sheet and the label are inevitably expensive because expensive glass microspheres are used and that complicated procedures are required for uniformly arranging the glass microspheres into a layer composed of the glass spheres alone.

A transparent brittle film which has a total light transmittance of 30% or more and is prepared from a composition containing 100 parts by weight of a vinyl chloride resin and 80 to 250 parts by weight of a material which is incompatible with the vinyl chloride resin and has an average particle size of 10μ or less and a refractive index of 1.7 or less, is also proposed (Japanese Patent Application Laid-Open No. Showa 64(1989)79237). However, because this transparent brittle film contains a vinyl chloride resin as the sole resin component, this film has a drawback in that formation of a film is difficult unless a large amount of a plasticizer, such as about 20 to 80 parts by weight of a plasticizer per 100 parts by weight of the vinyl chloride resin, is contained (35 parts by weight of a plasticizer was contained in an example), and this causes the problem that hardness and brittleness of the film are not always satisfactory. Moreover, similarly to the case of the above brittle film for marking (1), there is the possibility that adhesion of an adhesive material to the film becomes insufficient due to bleeding out of the plasticizer when the film is attached to an article through the adhesive material. Transparency and weatherability are not always sufficient because a vinyl chloride resin is used as the sole resin component. Resin compositions comprising a vinyl chloride resin have another drawback in that disposal and incineration of waste materials are difficult.

SUMMARY OF THE INVENTION

Accordingly, the present invention has an object of overcoming the drawbacks of conventional brittle films and providing a brittle film which has excellent transparency and weatherability, is brittle and easily torn, shows a suitable degree of flexibility and hardness, exhibits excellent adhesion to an adhesive material when the film is attached to a article through the adhesive material, is disposed or incinerated without problems, and can be produced inexpensively by a simple process.

As the result of the extensive studies conducted by the present inventors to develop a brittle film having the above advantageous properties, it has been found that the above object can be achieved by a film prepared from a resin composition comprising specific amounts of a thermoplastic acrylic resin having a specific elongation at break, a filler having a specific average diameter and specific diameters of constituting particles, and a plasticizer which is used optionally. The present invention has been completed on the basis of this knowledge.

Thus, the present invention provides:

(1) A thermoplastic acrylic resin brittle film prepared from a resin composition which comprises (A) 100 parts by weight of a thermoplastic acrylic resin having an elongation at break of 10 to 180%, (B) 10 to 70 parts by weight of at least one type of filler selected from the group consisting of (a) fused silica comprising aggregates of particles having an average diameter of the particles in the range of 5 to 20 μm and diameters of the particles in the range of 0.5 to 100 μm, (b) aluminum hydroxide comprising aggregates of particles having an average diameter of the particles in the range of 1 to 20 μm and diameters of the particles in the range of 0.2 to 50 μm, (c) barium sulfate comprising aggregates of particles having an average diameter of the particles in the range of 1 to 20 μm and diameters of the particles in the range of 0.2 to 50 μm, and (d) calcium carbonate comprising aggregates of particles having an average diameter of the particles in the range of 0.5 to 20 μm and diameters of the particles in the range of 0.1 to 50 μm, and (C) 0 to 30 parts by weight of a plasticizer;

(2) A thermoplastic acrylic resin brittle film described in (1), which has a tear strength of 3.0 to 20.0 g;

(3) A thermoplastic acrylic resin brittle film described in any of (1) and (2), which has a tensile strength at break of 1.0 to 3.0 kg/mm² and an elongation at break of 2.0 to 20.0%; and (4) A thermoplastic acrylic resin brittle film described in any of (1) to (3), which has a thickness of 20 to 80 μm.

DETAILED DESCRIPTION OF THE INVENTION

It is necessary that the thermoplastic acrylic resin used as component (A) in the film of the present invention have an elongation at break in the range of 10 to 180%. When the elongation at break is outside this range, it is difficult that a brittle film having a desired elongation at break is obtained. The elongation at break of the thermoplastic acrylic resin is preferably in the range of 20 to 140%. For the measurement of the elongation at break, a sample is conditioned by being left standing at the temperature 22 to 25° C. for 1 hour or more. The conditioned sample having a rectangular shape of a size of 20×100 mm is subjected to the test by using an Instron-type tensile tester under the condition of an extension speed of 5 mm/minute, a chart speed of 100 mm/minute, and a distance between chucks of 50 mm. The test is repeated 6 times, and the values of the elongation are averaged to obtain the elongation at break.

The above sample is prepared by coating a polyethylene phthalate film used as the support with a solution which is obtained by mixing the thermoplastic acrylic resin alone with a solvent and completely dissolving the thermoplastic acrylic resin into the solvent, and drying the solution by heating to obtain a film of the thermoplastic acrylic resin having a prescribed thickness.

Examples of the thermoplastic acrylic resin include homopolymers of alkyl esters of acrylic acid and alkyl esters of methacrylic acid in which the alkyl group preferably has about 1 to 15 carbon atoms, such as methyl acrylate, ethyl acrylate, n-propyl acrylate, isopropyl acrylate, n-butyl acrylate, isobutyl acrylate, sec-butyl acrylate, t-butyl acrylate, n-hexyl acrylate, cyclohexyl acrylate, 2-ethylhexyl acrylate, n-octyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, n-hexyl methacrylate, cyclohexyl methacrylate, 2-ethylhexyl methacrylate, and n-octyl methacrylate; copolymers obtained from combinations of two or more types of these alkyl esters of acrylic acid and alkyl esters of methacrylic acid; and copolymers obtained from combinations of one or more types of these alkyl esters of acrylic acid and alkyl esters of methacrylic add and one or more monomers selected from other copolymerizable monomers. Examples of the other copolymerizable monomer include acrylic acid, methacrylic acid, styrene, vinyltoluene, acrylonitrile, methacrylonitrile, acrylamide, methacrylamide, vinyl acetate, conjugated diene compounds such as butadiene, isoprene, 1,3-pentadiene, cyclopentadiene, and dicyclopentadiene, and non-conjugated diene compounds such as 1,4-hexadiene and ethylidenenorbornene.

The thermoplastic acrylic resin may be used singly or as a combination of two or more types. When a single type of the thermoplastic acrylic resin is used, it is necessary that the thermoplastic acrylic resin itself has an elongation at break in the range of 10 to 180%. When a combination of two or more types of the thermoplastic acrylic resin is used, thermoplastic acrylic resins used as the components may have an elongation at break outside the above range as long as the thermoplastic acrylic resin comprising the thermoplastic acrylic resins used as the components has an elongation at break in the range of 10 to 180%. The elongation at break of the thermoplastic acrylic resin can be adjusted by the chain length of the alkyl group in the alkyl ester of acrylic add or methacrylic acid which is used as the monomer. In general, an alkyl ester of acrylic acid or methacrylic acid having an alkyl group of a longer chain length tends to give a polymer having a larger elongation at break in comparison with an alkyl ester of acrylic acid or methacrylic acid having an alkyl group of a shorter chain length.

Preferable examples of the thermoplastic acrylic resin include (1) copolymers of methyl methacrylate, methyl acrylate, butyl acrylate, and styrene, and (2) mixtures of a copolymer of methyl methacrylate and methyl acrylate and a copolymer of methyl methacrylate, styrene, and butyl acrylate.

The filler used as component (B) in the film of the present invention has the functions of maintaining the transparency of the film and providing the film with brittleness. As the filler, fused silica, aluminum hydroxide, barium sulfate, calcium carbonate, or a mixture of these materials is used. In the present invention, it is necessary that fused silica comprise aggregates of particles having an average diameter of the particles in the range of 5 to 20 μm and diameters of the constituting particles in the range of 0.5 to 100 μm. When the average diameter of the particles is less than 5 μm, the dispersed solution containing the aggregates of particles shows poor homogeneity, and there is the possibility that transparency of the film becomes inferior. When the average diameter of the particles exceeds 20 μm, smoothness of the surface of the film is inferior. When the aggregates contain a large number of particles having a diameter less than 0.5 μm, the dispersed solution containing the aggregates of particles shows poor homogeneity and tends to have high viscosity. When the aggregates contain a large number of particles having a diameter exceeding 100 μm, the surface of the film becomes rough. From the standpoint of homogeneity and viscosity of the dispersed solution and transparency and smoothness of the film, it is preferable that fused silica has an average diameter of the particles in the above range and diameters of the particles constituting the aggregates in the range of 1 to 70 μm. It is particularly preferable that the fused silica has a broad distribution of the diameter of the particles.

It is necessary that aluminum hydroxide and barium sulfate each comprises aggregates of particles having an average diameter of the particles in the range of 1 to 20 μm and diameters of the constituting particles in the range of 0.2 to 50 μm. When the average diameter of the particles is less than 1 μm, the dispersed solution containing the aggregates of particles shows poor homogeneity, and there is the possibility that transparency of the film becomes inferior. When the average diameter of the particles exceeds 20 μm, smoothness of the surface of the film is inferior. When the aggregates contain a large number of particles having a diameter less than 0.2 μm, the dispersed solution containing the aggregates of particles shows poor homogeneity and tends to show high viscosity. When the aggregates contain a large number of particles having a diameter exceeding 50 μm, the surface of the film becomes rough. From the standpoint of homogeneity and viscosity of the dispersed solution and transparency and smoothness of the film, it is preferable that aluminum hydroxide and barium sulfate each has an average diameter of the particles in the above range and diameters of the particles constituting the particles in the range of 0.7 to 30 μm.

It is necessary that calcium carbonate comprises aggregates of particles having an average diameter of the particles in the range of 0.5 to 20 μm and diameters of the constituting particles in the range of 0.1 to 50 μm. When the average diameter of the particles is less than 0.5 μm, the dispersed solution containing the aggregates of particles shows poor homogeneity, and there is the possibility that transparency of the film becomes inferior. When the average diameter of the particles exceeds 20 μm, smoothness of the surface of the film is inferior. When the aggregates contain a large amount of particles having a diameter less than 0.1 μm, the dispersed solution containing the aggregates of particles shows poor homogeneity and tends to show high viscosity. When the aggregates contain a large amount of particles having a diameter exceeding 50 μm, the surface of the film becomes rough. From the standpoint of homogeneity and viscosity of the dispersed solution and transparency and smoothness of the film, it is preferable that calcium carbonate has an average diameter of the particles in the above range and diameters of the particles constituting the particles in the range of 0.2 to 30 μm. Any of calcium carbonate prepared by the precipitation process, heavy calcium carbonate, and light calcium carbonate can be used as the above calcium carbonate. The diameter of the particles of the filler used as component (B) in the present invention is-measured in accordance with the method of sedimentation turbidity.

In the present invention, the content of the filler is selected in the range of 10 to 70 parts by weight per 100 parts by weight of the thermoplastic acrylic resin of component (A). When the content is less than 10 parts by weight, brittleness of the film is insufficient. When the content exceeds 70 parts by weight, transparency of the film is inferior, and the film becomes excessively brittle to deteriorate the property for handling. From the standpoint of transparency, brittleness, and the property for handling of the film, the content of the filler is preferably in the range of 20 to 50 parts by weight per 100 parts by weight of the thermoplastic acrylic resin.

In the film of the present invention, it is not always required that a plasticizer be used because the resin component is a thermoplastic acrylic resin. However, a plasticizer may be used as component (C) to provide the film with a suitable degree of flexibility. The plasticizer is not particularly limited and a suitable plasticizer may be selected from conventional plasticizers used for thermoplastic acrylic resins. For example, plasticizers having good compatibility with the thermoplastic acrylic resin (A) can be used. Examples of such plasticizers include alkyl benzyl phthalates, such as octyl benzyl phthalate and myristyl benzyl phthalate; dialkyl phthalates, such as dibutyl phthalate, dihexyl phthalate, and dioctyl phthalate; esters of phosphoric acid, such as tricresyl phosphate and trioctyl phosphate; esters of fatty adds, such as dibutyl sebacate and acetyl tributyl citrate; polyesters, such as polyesters derived from adipic acid, polyesters derived from sebacic acid, and polyesters derived from phthalic acid; derivatives of glycols, such as diethylene glycol dibenzoate, dipropylene glycol dibenzoate, and triethylene glycol di(2-ethylhexoate); derivatives of glycerol, such as glycerol triacetate and glycerol tributyrate; and epoxy derivatives, such as epoxidized soy bean oil.

In the present invention, the plasticizer may be used singly or in a combination of two or more types. The content of the plasticizer is selected in the range of 0 to 30 parts by weight per 100 parts by weight of the thermoplastic acrylic resin of component (A). When the content exceeds 30 parts by weight, the film becomes excessively soft, and brittleness is decreased. Therefore, the object of the present invention is not achieved. From the standpoint of the film forming property of the dispersed solution and suitable flexibility and brittleness of the film, the content of the plasticizer is preferably in the range of 0 to 20 parts by weight per 100 parts by weight of the thermoplastic acrylic resin.

The brittle film of the present invention is prepared by using a resin composition comprising components (A) and (B) and optional component (C). The resin composition may additionally contain various additives, such as antioxidants, ultraviolet absorbents, light stabilizers, antistatic agents, flame retarders, coloring agents such as dyestuffs and pigments, and coloring fillers, in accordance with desire within the range that the object of the present invention is not adversely affected.

The thickness of the brittle film of the present invention is generally in the range of 20 to 80 μm. When the thickness is less than 20 μm, the film is excessively easily torn to deteriorate the property for handling. When the thickness exceeds 80 μm, transparency and flatness are inferior, and cost is increased. From the standpoint of having a good balance between the property for handling, transparency, flatness, and economy, the thickness is preferably in the range of 35 to 65 μm.

The thermoplastic brittle film of the present invention preferably has a tear strength in the range of 3.0 to 20.0 g. When the tear strength is less than 3.0 g, the film is excessively easily torn to deteriorate the property for handling. When the tear strength exceeds 20.0 g, brittleness is decreased. Therefore, such a tear strength is not preferable. From the standpoint of having a good balance between the property for handling and brittleness, the tear strength is preferably in the range of 5.0 to 17.0 g. For the measurement of the tear strength, a sample is conditioned by being left standing at the temperature 22 to 25° C. for 1 hour or more. Ten sheets of the conditioned sample having a size of 50×100 mm were laid to form a laminate, and the Elmendorf tear test of the laminate was repeated 6 times in accordance with the method of Japanese Industrial Standard K 7128. From the results obtained by the test, the average value of the tear strengths was obtained, and 1/10 of the obtained value was used as the tear strength of the sample.

The film of the present invention preferably has a tensile strength at break in the range of 1.0 to 3.0 kg/mm$^2$ and an elongation at break in the range of 2.0 to 20.0%. When the tensile strength at break is less than 1.0 kg/mm$^2$, the strength is excessively small to deteriorate the property for handling. When the tensile strength exceeds 3.0 kg/mm$^2$ the film is excessively hard to cause inferior fitting when the film is attached to curved surfaces. From the standpoint of the property for handling and fitting to curved surfaces, the tensile strength at break is more preferably in the range of 1.5 to 2.5 kg/mm$^2$. When the elongation at break is less than 2.0%, flexibility is excessively small, and the property for handling is inferior. When the elongation at break exceeds 20.0%, the brittleness tends to be decreased. From the standpoint of the property for handling and brittleness, the elongation at break is more preferably 3.0 to 15.0%. For the measurement of the tensile strength at break and the elongation at break, a sample was conditioned by being left standing at the temperature 22 to 25° C. for 1 hour or more. The conditioned sample having a rectangular shape of a size of 20×100 mm was subjected to the test by using an Instron-type tensile tester under the condition of an extension speed of 5 mm/minute, a chart speed of 100 mm/minute, and a distance between chucks of 50 mm. The test was repeated 6 times, and the values of the tensile strength and the elongation were averaged to obtain the tensile strength at break and the elongation at break, respectively.

When the film of the present invention is prepared in the form of a transparent brittle film without adding color pigments or coloring fillers, the film generally has a light transmittance of 20% or more, preferably 30% or more, for light in the range of the wave length of 300 to 700 nm. The above light transmittance is obtained by the measurement using the computer color matching system (CCM).

The process for producing the brittle film of the present invention is not particularly limited. For example, the film can be produced by any of the casting process, the extrusion process, the calendering process, or the solution coating process. Among these processes, the solution coating process is preferable from the standpoint of productivity and quality of the produced film.

In the solution coating process, a homogeneous dispersed solution of a resin composition is prepared by thoroughly mixing a suitable solvent, components (A) and (B), optional component (C), and various additives used where necessary. A support having the releasing property, such as a processing paper and a polyethylene terephthalate film, is coated with the prepared dispersed solution to a prescribed thickness, and a brittle film is prepared by drying the dispersed solution on the support at 80 to 180° C. As the solvent used in the above process, a solvent which dissolves the resin of component (A) and has a boiling point of about 80 to 180° C. is preferable. Examples of such a solvent include aromatic hydrocarbons, such as toluene, xylene, ethylbenzene, and trimethylbenzene; ketones, such as methyl ethyl ketone, diisobutyl ketone, and cyclohexanone; and dimethylformamide. The solvent may be used singly or as a combination of two or more types. The amount of the solvent used in the solution coating process is generally 100 to 400 parts by weight, preferably 150 to 350 parts by weight, per 100 parts by weight of the thermoplastic acrylic resin of component (A).

A brittle film for laser marking comprises two different colored layers. A colored lower layer which is different from a color of a surface layer appears by heating and sublimating the surface layer under laser energy and fine characters or lines can be clearly marked. Any colored layer can be used. A color of the lower layer is preferably black or white so that the characters or lines appear clearly.

It is preferable that a thickness of the surface layer is thinner than that of the lower layer because of laser etching. The thickness of the surface layer may be 45% or less of the brittle film, and preferably 30% or less.

It is necessary that the thermoplastic acrylic resin used as each component (A) in the film comprising two layers of the present invention have an elongation at break in the range of 10 to 180%. When the elongation at break is outside this range, it is difficult that a brittle film having a desired elongation at break is obtained. The elongation at break of the thermoplastic acrylic resin is preferably in the range of 20 to 140%.

The thickness of the brittle film comprising two layers of the present invention is generally in the range of to 80 μm. When the thickness is less than 20 μm, the film is excessively easily torn to deteriorate the property for handling. When the thickness exceeds 80 μm, flatness is inferior, and cost is increased. From the standpoint of having a good balance between the property for handling, flatness, and economy, the thickness is preferably in the range of 35 to 65 μm.

The film comprising two layers of the present invention preferably has a tear strength in the range of 3.0 to 20.0 g. When the tear strength is less than 3.0 g, the film is excessively easily torn to deteriorate the property for handling. When the tear strength exceeds 20.0 g, brittleness is decreased. Therefore, such a tear strength is not preferable. From the standpoint of having a good balance between the property for handling and brittleness, the tear strength is preferably in the range of 5.0 to 17.0 g.

The thermoplastic acrylic resin brittle film of the present invention may be used in an adhesive sheet. An adhesive layer is applied on the thermoplastic acrylic resin brittle film to obtain the adhesive sheet.

Examples of the adhesive used in the adhesive sheet of the present invention include pressure-sensitive adhesives based on natural rubbers, synthetic rubbers, acrylic resins, silicone resins and the like.

To summarize the advantages of the present invention, the thermoplastic acrylic resin brittle film of the present invention has the following characteristics:

(1) The film is brittle and easily torn and has a suitable degree of flexibility and hardness;

(2) The film can be produced inexpensively by a simple process;

(3) Because it is not necessary that a plasticizer is used as an essential component, adhesion of the film to an adherent does not have an adverse effect of bleeding out of a plasticizer when the film is attached to an article through the adhesive;

(4) The film shows excellent transparency when no coloring pigments or coloring fillers are used as optional components;

(5) The film has excellent weatherability and can be formed into a thin film; and (6) The film is easily disposed or incinerated because no vinyl chloride resin is used.

Therefore, the film can be used for labels and stickers, such as certificate stamps and sealing labels, and display stickers, such as marks for danger prevention and marks for commercial products, and also for prevention of forgery of passports. The film is particularly advantageously used as a base film for labels for preventing transfer, such as labels for preventing theft and certificate stamps.

EXAMPLES

The present invention is described in more detail with reference to examples in the following. However, the examples are not to be construed to limit the scope of the invention.

For evaluation of the quality of the obtained film, light transmittance (300 to 700 nm), tear strength, tensile strength at break, and elongation at break were obtained in accordance with the methods described above. The thickness was also measured.

Example 1

A copolymer of methyl methacrylate and methyl acrylate (a product of MITSUBISHI RAYON Co., Ltd., ACRYPET MD, elongation at break: 2.6%) in an amount of 60 parts by weight, 40 parts by weight of a copolymer of methyl methacrylate, styrene, and butyl acrylate (a product of MITSUBTSHI RAYON Co., Ltd., ACRYPET RF065, elongation at break: 165.0%), 30 parts by weight of fused silica (a product of TATSUMORI Co., Ltd., FUSELEX E-2, average particle diameter: 6.2 μm, range of particle diameter: 1 to 48 μm), 176 parts by weight of dimethylformamide, and 68 parts by weight of methyl ethyl ketone were mixed together. The components were sufficiently dissolved or dispersed by being stirred, and a dispersed solution containing 33.5% by weight of solid substances was prepared.

A polyethylene terephthalate film as the support was coated with the dispersed solution prepared above. The obtained product was heated to 180° C. to vaporize the solvents and then dried to obtain a transparent brittle film having a thickness of 48 μm. The quality of the obtained film is shown in Table 1.

Examples 2 to 15 and Comparative Examples 1 to 7

Dispersed solutions having the compositions shown in Table 1 were prepared in accordance with the same procedures as those conducted in Example 1, and transparent brittle films were prepared from these dispersed solutions. The quality of the obtained films is shown in Table 1.

TABLE 1-1

| Example | 1 | 2 | 3 |
|---|---|---|---|
| Composition of dispersed solution (part by wt.) | | | |
| component (A) | | | |
| ACRYPET MD[1] | 60 | 40 | 60 |
| ACRYPET RF065[2] | 40 | 60 | 40 |
| DELPET SR8350[3] | — | — | — |
| DELPET SR8500[4] | — | — | — |
| elongation at break[5] (%) | 24.6 | 57.2 | 24.6 |
| filler of component (B)[6] | | | |
| type | fused silica | fused silica | aluminum hydroxide |
| amount | 30 | 30 | 30 |
| component (C) | | | |
| PN350[7] | — | — | — |
| solvent | | | |
| DMF[8] | 182 | 188 | 182 |

TABLE 1-1-continued

| Example | 1 | | 2 | | 3 | |
|---|---|---|---|---|---|---|
| MEK[9] | 76 | | 84 | | 76 | |
| Concentration of solid substances (% by wt.) | 33.5 | | 32.3 | | 33.5 | |
| Quality of the film | | | | | | |
| thickness (μm) | 46 | | 44 | | 51 | |
| tensile strength at break (kg/mm$^2$) | 2.40 | 2.31 | 2.30 | 2.08 | 2.02 | 2.27 |
| elongation at break (%) | 2.2 | 2.7 | 4.7 | 4.3 | 4.4 | 4.2 |
| tear strength (g) | 8.4 | 8.2 | 8.2 | 8.2 | 9.2 | 9.4 |
| light transmittance (%) | 50–63 | | 49–61 | | 34–39 | |

[1]ACRYPET MD: a copolymer of methyl methacrylate and methyl acrylate, a product of MITSUBISHI RAYON Co., Ltd., elongation at break: 2.6%.
[2]ACRYPET RF065: a copolymer of methyl methacrylate, styrene, and butyl acrylate, a product of MITSUBISHI RAYON Co., Ltd., elongation at break: 165.0%.
[3]DELPET SR8350: a copolymer of methyl methacrylate, methyl acrylate, butyl acrylate, and styrene, a product of ASAHI KASEI KOGYO Co., Ltd., elongation at break: 77.1%.
[4]DELPET SR8500: a copolymer of methyl methacrylate, methyl acrylate, butyl acrylate, and styrene, a product of ASAHI KASEI KOGYO Co., Ltd., elongation at break: 92.9%.
[5]Elongation at break of the thermoplastic acrylic resin listed above or the mixture of the thermoplastic acrylic resins listed above.
[6]Fillers
fused silica: a product of TATSUMORI Co., Ltd., FUSELEX E-2, average particle diameter: 6.2 μm, range of particle diameters: 1 to 48 μm.
aluminum hydroxide: a product of SHOWA DENKO Co., Ltd., H-32, average particle diameter: 15 μm, range of particle diameters: 3 to 20 μm.
calcium carbonate: a product of TAKEHARA KAGAKU KOGYO Co., Ltd., SL300, average particle diameter: 2 to 3 μm, range of particle diameters: 1 to 8 μm.
barium sulfate: a product of SAKAI KAGAKU KOGYO Co., Ltd.; average particle diameter: 3.5 μm, range of particle diameters: 2 to 6 μm.
[7]PN350: a polyester plasticizer, a product of ASAHI DENKA Co., Ltd.
[8]DMF: dimethylformamide
[9]MEK: methyl ethyl ketone.

TABLE 1-2

| Example | 4 | 5 | 6 | 7 | 8 |
|---|---|---|---|---|---|
| Composition of dispersed solution (part by wt.) | | | | | |
| component (A) | | | | | |
| ACRYPET MD[1] | 60 | 60 | — | — | 60 |
| ACRYPET RF065[2] | 40 | 40 | — | — | 40 |
| DELPET SR8350[3] | — | — | 100 | — | — |
| DELPET SR8500[4] | — | — | — | 100 | — |
| Elongation at break[5] (%) | 24.6 | 24.6 | 77.1 | 92.9 | 24.6 |
| filler of component (B)[6] | | | | | |
| type | calcium carbonate | barium sulfate | fused silica | fused silica | fused silica |
| amount | 30 | 30 | 30 | 30 | 30 |
| component (C) | | | | | |
| PN350[7] | — | — | — | — | 5 |
| solvent | | | | | |
| DMF[8] | 182 | 182 | 200 | 200 | 182 |
| MEK[9] | 76 | 76 | 100 | 100 | 76 |
| Concentration of solid | 33.5 | 33.5 | 30.2 | 30.2 | 34.4 |

TABLE 1-2-continued

| Example | 4 | | 5 | | 6 | | 7 | | 8 | |
|---|---|---|---|---|---|---|---|---|---|---|
| substances (% by wt.) Quality of the film | | | | | | | | | | |
| thickness ($\mu$m) | 47 | | 53 | | 47 | | 46 | | 45 | |
| tensile strength at break (kg/mm$^2$) | 2.58 | 2.62 | 2.42 | 2.38 | 2.69 | 2.65 | 2.66 | 2.66 | 2.56 | 2.46 |
| elongation at break (%) | 4.9 | 3.5 | 3.6 | 3.5 | 3.9 | 3.7 | 6.9 | 7.2 | 2.8 | 3.0 |
| tear strength (g) | 10.0 | 10.0 | 9.6 | 10.2 | 9.4 | 9.8 | 9.2 | 9.8 | 9.2 | 9.6 |
| light transmittance (%) | 335–41 | | 20–28 | | 50–62 | | 47–60 | | 50–65 | |

[1] ACRYPET MD: a copolymer of methyl methacrylate and methyl acrylate, a product of MITSUBISHI RAYON Co., Ltd., elongation at break: 2.6%.
[2] ACRYPET RF065: a copolymer of methyl methacrylate, styrene, and butyl acrylate, a product of MITSUBISHI RAYON Co., Ltd., elongation at break: 165.0%.
[3] DELPET SR8350: a copolymer of methyl methacrylate, methyl acrylate, butyl acrylate, and styrene, a product of ASAHI KASEI KOGYO Co., Ltd., elongation at break: 77.1%.
[4] DELPET SR8500: a copolymer of methyl methacrylate, methyl acrylate, butyl acrylate, and styrene, a product of ASAHI KASEI KOGYO Co., Ltd., elongation at break: 92.9%.
[5] Elongation at break of the thermoplastic acrylic resin listed above or the mixture of the thermoplastic acrylic resins listed above.
[6] Fillers
fused silica: a product of TATSUMORI Co., Ltd., FUSELEX E-2, average particle diameter: 6.2 $\mu$m, range of particle diameters: 1 to 48 $\mu$m.
aluminum hydroxide: a product of SHOWA DENKO Co., Ltd., H-32, average particle diameter: 15 $\mu$m, range of particle diameters: 3 to 20 $\mu$m.
calcium carbonate: a product of TAKEHARA KAGAKU KOGYO Co., Ltd., SL300, average particle diameter: 2 to 3 $\mu$m, range of particle diameters: 1 to 8 $\mu$m.
barium sulfate: a product of SAKAI KAGAKU KOGYO Co., Ltd.; average particle diameter: 3.5 $\mu$m, range of particle diameters: 2 to 6 $\mu$m.
[7] PN350: a polyester plasticizer, a product of ASAHI DENKA Co., Ltd.
[8] DMF: dimethylformamide
[9] MEK: methyl ethyl ketone.

TABLE 1-3

| Example | 9 | | 10 | | 11 | | 12 | | 13 | |
|---|---|---|---|---|---|---|---|---|---|---|
| Composition of dispersed solution (part by wt.) | | | | | | | | | | |
| component (A) | | | | | | | | | | |
| ACRYPET MD[1] | 60 | | 60 | | — | | — | | — | |
| ACRYPET RF065[2] | 40 | | 40 | | 100 | | 100 | | 100 | |
| DELPET SR8350[3] | — | | — | | — | | — | | — | |
| DELPET SR8500[4] | — | | — | | — | | — | | — | |
| elongation at break[5] (%) | 24.6 | | 24.6 | | 165.0 | | 165.0 | | 165.0 | |
| filler of component (B)[6] | | | | | | | | | | |
| type | fused silica | | fused silica | | fused silica | | fused silica | | fused silica | |
| amount | 30 | | 30 | | 50 | | 60 | | 70 | |
| component (C) | | | | | | | | | | |
| PN350[7] | 10 | | 15 | | — | | — | | — | |
| solvent | | | | | | | | | | |
| DMF[8] | 182 | | 182 | | 205 | | 210 | | 215 | |
| MEK[9] | 76 | | 76 | | 100 | | 100 | | 100 | |
| Concentration of solid substances (% by wt.) | 35.2 | | 36.0 | | 33.0 | | 34.0 | | 35.1 | |
| Quality of the film | | | | | | | | | | |
| thickness ($\mu$m) | 47 | | 47 | | 48 | | 50 | | 50 | |
| tensile strength at break (kg/mm$^2$) | 2.20 | 2.19 | 1.98 | 1.96 | 1.34 | 1.32 | 1.37 | 1.34 | 1.40 | 1.36 |
| elongation at break (%) | 2.7 | 3.2 | 3.1 | 3.4 | 7.4 | 7.3 | 4.6 | 4.5 | 2.5 | 2.6 |

TABLE 1-3-continued

| Example | 9 | | 10 | | 11 | | 12 | | 13 | |
|---|---|---|---|---|---|---|---|---|---|---|
| tear strength (g) | 10.4 | 10.8 | 9.6 | 10.2 | 9.8 | 9.6 | 8.2 | 8.2 | 6.8 | 6.6 |
| light transmittance (%) | 50–65 | | 51–67 | | 45–52 | | 42–49 | | 41–46 | |

[1] ACRYPET MD: a copolymer of methyl methacrylate and methyl acrylate, a product of MITSUBISHI RAYON Co., Ltd., elongation at break: 2.6%.
[2] ACRYPET RF065: a copolymer of methyl methacrylate, styrene, and butyl acrylate, a product of MITSUBISHI RAYON Co., Ltd., elongation at break: 165.0%.
[3] DELPET SR8350: a copolymer of methyl methacrylate, methyl acrylate, butyl acrylate, and styrene, a product of ASAHI KASEI KOGYO Co., Ltd., elongation at break: 77.1%.
[4] DELPET SR8500: a copolymer of methyl methacrylate, methyl acrylate, butyl acrylate, and styrene, a product of ASAHI KASEI KOGYO Co., Ltd., elongation at break: 92.9%.
[5] Elongation at break of the thermoplastic acrylic resin listed above or the mixture of the thermoplastic acrylic resins listed above.
[6] Fillers
fused silica: a product of TATSUMORI Co., Ltd., FUSELEX E-2, average particle diameter: 6.2 μm, range of particle diameters: 1 to 48 μm.
aluminum hydroxide: a product of SHOWA DENKO Co., Ltd., H-32, average particle diameter: 15 μm, range of particle diameters: 3 to 20 μm.
calcium carbonate: a product of TAKEHARA KAGAKU KOGYO Co., Ltd., SL300, average particle diameter: 2 to 3 μm, range of particle diameters: 1 to 8 μm.
barium sulfate: a product of SAKAI KAGAKU KOGYO Co., Ltd.; average particle diameter: 3.5 μm, range of particle diameters: 2 to 6 μm.
[7] PN350: a polyester plasticizer, a product of ASAHI DENKA Co., Ltd.
[8] DMF: dimethylformamide
[9] MEK: methyl ethyl ketone.

TABLE 1-4

| | Example | | Comparative Example | | |
|---|---|---|---|---|---|
| | 14 | 15 | 1 | 2 | 3 |
| Composition of dispersed solution (part by wt.) | | | | | |
| component (A) | | | | | |
| ACRYPET MD[1] | 40 | 40 | 100 | — | — |
| ACRYPET RF065[2] | 40 | 60 | — | — | — |
| DELPET SR8350[3] | — | — | — | 100 | — |
| DELPET SR8500[4] | — | — | — | — | 100 |
| elongation at break[5] (%) | 24.6 | 57.2 | 2.6 | 77.1 | 92.9 |
| filler of component (B)[6] | | | | | |
| type | fused silica | fused silica | fused silica | — | — |
| amount | 20 | 20 | 30 | — | — |
| component (C) | | | | | |
| PN350[7] | — | — | — | — | — |
| solvent | | | | | |
| DMF[8] | 182 | 188 | 170 | 200 | 200 |
| MEK[9] | 76 | 84 | 60 | 100 | 100 |
| Concentration of solid substances (% by wt.) | 31.7 | 30.6 | 36.1 | 25.0 | 25.0 |
| Quality of the film | | | | | |
| thickness (μm) | 46 | 45 | 44 | 49 | 50 |
| tensile strength at break (kg/mm²) | 2.76 2.72 | 2.28 2.20 | 2.40 2.45 | 3.25 3.12 | 2.90 2.88 |
| Elongation at break (%) | 4.0 3.8 | 7.3 6.8 | 1.0 1.0 | 78.8 75.3 | 92.7 93.0 |
| tear strength (g) | 11.2 11.4 | 11.4 11.6 | 6.8 7.4 | 23.2 23.8 | 23.2 23.4 |
| light transmittance (%) | 58–73 | 57–72 | 52–67 | 90–92 | 90–92 |

[1] ACRYPET MD: a copolymer of methyl methacrylate and methyl acrylate, a product of MITSUBISHI RAYON Co., Ltd., elongation at break: 2.6%.
[2] ACRYPET RF065: a copolymer of methyl methacrylate, styrene, and butyl acrylate, a product of MITSUBISHI RAYON Co., Ltd., elongation at break: 165.0%.

TABLE 1-4-continued

|  | Example | | Comparative Example | | |
|---|---|---|---|---|---|
|  | 14 | 15 | 1 | 2 | 3 |

[3] DELPET SR8350: a copolymer of methyl methacrylate, methyl acrylate, butyl acrylate, and styrene, a product of ASAHI KASEI KOGYO Co., Ltd., elongation at break: 77.1%.
[4] DELPET SR8500: a copolymer of methyl methacrylate, methyl acrylate, butyl acrylate, and styrene, a product of ASAHI KASEI KOGYO Co., Ltd., elongation at break: 92.9%.
[5] Elongation at break of the thermoplastic acrylic resin listed above or the mixture of the thermoplastic acrylic resins listed above.
[6] Fillers
fused silica: a product of TATSUMORI Co., Ltd., FUSELEX E-2, average particle diameter: 6.2 μm, range of particle diameters: 1 to 48 μm.
aluminum hydroxide: a product of SHOWA DENKO Co., Ltd., H-32, average particle diameter: 15 μm, range of particle diameters: 3 to 20 μm.
calcium carbonate: a product of TAKEHARA KAGAKU KOGYO Co., Ltd., SL300, average particle diameter: 2 to 3 μm, range of particle diameters: 1 to 8 μm.
barium sulfate: a product of SAKAI KAGAKU KOGYO Co., Ltd.; average particle diameter: 3.5 μm, range of particle diameters: 2 to 6 μm.
[7] PN350: a polyester plasticizer, a product of ASAHI DENKA Co., Ltd.
[8] DMF: dimethylformamide
[9] MEK: methyl ethyl ketone.

TABLE 1-5

| Comparative Example | 4 | 5 | 6 | 7 |
|---|---|---|---|---|
| Composition of dispersed solution (part by wt.) | | | | |
| component (A) | | | | |
| ACRYPET MD[1] | 100 | 60 | — | 80 |
| ACRYPET RF065[2] | — | 40 | 100 | 20 |
| DELPET SR8350[3] | — | — | — | — |
| DELPET SR8500[4] | — | — | — | — |
| elongation at break[5] (%) | 2.6 | 24.6 | 165.0 | 11.1 |
| filler of component (B)[6] | | | | |
| type | — | — | — | — |
| amount | — | — | — | — |
| component (C) | | | | |
| PN350[7] | — | — | — | — |
| solvent | | | | |
| DMF[8] | 170 | 182 | 200 | 176 |
| MEK[9] | 60 | 76 | 100 | 68 |
| Concentration of solid substances (% by wt.) | 30.3 | 27.9 | 25.0 | 29.1 |
| Quality of the film | | | | |
| thickness (μm) | 46 | 46 | 47 | 45 |
| tensile strength at break (kg/mm$^2$) | 4.26  4.16 | 3.26  3.22 | 1.70  1.68 | 3.62  3.64 |
| elongation at break (%) | 2.6  2.5 | 24.4  24.8 | 162  168 | 10.9  11.2 |
| tear strength (g) | 23.8  23.4 | 25.0  24.8 | 27.8  28.4 | 13.7  13.6 |
| light transmittance (%) | 90–92 | 90–92 | 90–92 | 90–92 |

[1] ACRYPET MD: a copolymer of methyl methacrylate and methyl acrylate, a product of MITSUBISHI RAYON Co., Ltd., elongation at break: 2.6%.
[2] ACRYPET RF065: a copolymer of methyl methacrylate, styrene, and butyl acrylate, a product of MITSUBISHI RAYON Co., Ltd., elongation at break: 165.0%.
[3] DELPET SR8350: a copolymer of methyl methacrylate, methyl acrylate, butyl acrylate, and styrene, a product of ASAHI KASEI KOGYO Co., Ltd., elongation at break: 77.1%.
[4] DELPET SR8500: a copolymer of methyl methacrylate, methyl acrylate, butyl acrylate, and styrene, a product of ASAHI KASEI KOGYO Co., Ltd., elongation at break: 92.9%.
[5] Elongation at break of the thermoplastic acrylic resin listed above or the mixture of the thermoplastic acrylic resins listed above.
[6] Fillers
fused silica: a product of TATSUMORI Co., Ltd., FUSELEX E-2, average particle diameter: 6.2 μm, range of particle diameters: 1 to 48 μm.
aluminum hydroxide: a product of SHOWA DENKO Co., Ltd., H-32, average particle diameter: 15 μm, range of particle diameters: 3 to 20 μm.

TABLE 1-5-continued

| Comparative Example | 4 | 5 | 6 | 7 |
|---|---|---|---|---| calcium carbonate: a product of TAKEHARA KAGAKU KOGYO Co., Ltd., SL300, average particle diameter: 2 to 3 μm, range of particle diameters: 1 to 8 μm.
barium sulfate: a product of SAKAI KAGAKU KOGYO Co., Ltd.; average particle diameter: 3.5 μm, range of particle diameters: 2 to 6 μm.
[7]PN350: a polyester plasticizer, a product of ASAHI DENKA Co., Ltd.
[8]DMF: dimethylformamide
[9]MEK: methyl ethyl ketone.

Where two values are shown side-by-side in Table 1 of tensile strength at break, elongation at break and tear strength, the left value shows the value obtained in the longitudinal direction and the right value shows the value obtained in the transverse direction.

As shown in Table 1, all brittle films of the present invention were brittle and easily torn, had a suitable degree of flexibility, and showed excellent transparency. When the brittle films comprising various types of filler are compared, the brittle films comprising fused silica showed more excellent transparency than that of the films comprising aluminum hydroxide, calcium carbonate, or barium sulfate.

In contrast, the film obtained in Comparative Example 1 showed inferior flexibility and had a small elongation at break because a thermoplastic acrylic resin having an elongation at break of 2.6% was used. Therefore, this film is not suitable as a brittle film. The films obtained in Comparative Examples 2 to 7 which comprised no filler had inferior brittleness as shown by large tear strengths and large tensile strengths at break although the films had excellent transparency. These films had large elongations at break, also.

Example 16

A dispersed solution containing two types of coating material shown in Table 2 was prepared in accordance with the same procedures as those conducted in Example 1, and a colored transparent brittle film was prepared from this dispersed solution. The quality of the obtained film is shown in Table 2.

Examples 17 and 18

Dispersed solutions having the compositions shown in Table 2 were prepared in accordance with the same procedures as those conducted in Example 1, and opaque brittle films were prepared from these dispersed solutions. The quality of the obtained films is shown in Table 2.

TABLE 2

| Example | 16 | 17 | 18 |
|---|---|---|---|
| Composition of dispersed solution (part by wt.) | | | |
| component (A) | | | |
| ACRYPET MD[1] | 40 | 60 | m |
| ACRYPET RF065[2] | 60 | 40 | 40 |
| elongation at break[5] (%) | 57.2 | 24.6 | 24.6 |
| filler of component (B)[6] | | | |
| type | fused silica | calcium carbonate | calcium carbonate |
| amount | 25 | 10 | 10 |
| component (C) | | | |
| PN350[7] | — | 24 | 17 |
| other additives | | | |
| type | ME1343[10] ME1345[11] | ME1011P[12] | CR60[13] |
| amount | 0.80 1.00 | 6 | 60 |
| solvent | | | |
| DMF[8] | 188 | 182 | 182 |
| MEK[9] | 84 | 75 | 75 |
| Concentration of solid substances (% by wt.) | 31.8 | 35.3 | 42.1 |
| Quality of the film | | | |
| thickness (μm) | 30 | 49 | 49 |
| tensile strength at break (kg/mm$^2$) | 2.17 2.00 | 1.80 | 2.42 |
| elongation at break (%) | 4.6 4.3 | 6.7 | 3.1 |

TABLE 2-continued

| Example | 16 | | 17 | 18 |
|---|---|---|---|---|
| tear strength (g) | 6.4 | 6.6 | 13.0 | 8.0 |
| light transmittance (%) | 35–65 | | — | — |

[1], [2], [5], [6], [7], [8], and [9] the same as those described for Table 1.
[10] ME1343; isoindolinone yellow, a produce of NIKKO BICKS Co., Ltd.
[11] ME1345; polyazo yellow, a product of NIKKO BICKS Co., Ltd.
[12] ME1011P; carbon black, a product of NIKKO BICKS Co., Ltd.
[13] CR60; titanium oxide, a product of ISHIHARA SANGYO Co., Ltd.

Where two values are shown side-by-side in Table 2 of tensile strength at break, elongation at break and tear strength, the left value shows the value obtained in the longitudinal direction and the right value shows the value obtained in the transverse direction.

Where only one value is shown in Table 2 of tensile strength at break, elongation at break and tear strength, the value shows the value obtained in the longitudinal direction.

Example 19

In accordance with the same procedures as those conducted in Example 1, the dispersed solution for the surface layer having the composition shown in Table 3 was prepared and a polyethylene terephthalate film as the support was coated with the dispersed solution for the surface layer. The obtained product was heated to 180° C. to vaporize the solvents and then dried to obtain a thermoplastic brittle film having a thickness of 10 $\mu$m. Then, the dispersed solution for the lower layer having the composition shown in Table 3 was prepared in accordance with the same procedures as those conducted above and the film of the surface layer obtained above was coated with the dispersed solution for the lower layer. Again, the obtained product was heated to 180° C. to vaporize the solvents and then dried to obtain a thermoplastic brittle film comprising two layers having a total thickness of 50 $\mu$m. The quality of the obtained film is shown in Table 3.

Example 20

A thermoplastic brittle film was prepared in accordance with the same procedures as those conducted n Example 19 except that a thickness of the surface layer of the film is 20 $\mu$m and a thickness of the finally obtained brittle film is 60 $\mu$m. The quality of the obtained film is shown in Table 3.

These brittle films were used for laser markings and showed clear characters.

Example 21

An acrylic pressure-sensitive adhesive layer having a thickness of 25 $\mu$m was applied on the thermoplastic acrylic resin brittle film obtained in Examples 1, 3 to 5, 17 and 19 (on the lower layer (white) in Example 19) to obtain an adhesive sheet. These adhesive sheets were cut to a size of 2×5 cm, and attached to acrylic plates. An attempt was made to peel the thermoplastic acrylic resin brittle film from the acrylic plate after 24 hours, but it could not be peeled well because the film is brittle.

TABLE 3

| | 19 | | 20 | |
|---|---|---|---|---|
| Example | first layer | second layer | first layer | second layer |
| Composition of dispersed solution (part by wt.) | | | | |
| component (A) | | | | |
| ACRYPET MD[1] | 50 | 50 | 50 | 50 |
| ACRYPET RF065[2] | 50 | 50 | 50 | 50 |
| elongation at break[5] (%) | 41 | 41 | 41 | 41 |
| component (B) | | | | |
| FUSELEX E-2[6] | 10 | 10 | 20 | 20 |
| component (C) | | | | |
| PN350[7] | 12 | 17 | 5 | 12 |
| solvent | | | | |
| DMF[8] | 200 | 200 | 200 | 200 |
| MEK[9] | 90 | 90 | 90 | 90 |
| coloring agent | | | | |
| ME1345[11] | — | — | 25 | — |
| ME1011P[12] | 12 | — | — | 12 |
| CR60[13] | — | 45 | 5 | — |
| ultraviolet absorbent | | | | |
| MARK1413[14] | 3 | 3 | 3 | 3 |
| Concentration of solid | 32.0 | 37.6 | 35.2 | 33.6 |

TABLE 3-continued

| Example | 19 | | 20 | |
|---|---|---|---|---|
| | first layer | second layer | first layer | second layer |
| substances (% by wt.) Film | | | | |
| color | black | white | yellow | black |
| thickness (pm) | 10 | 40 | 20 | 40 |
| Quality of the film | | | | |
| thickness ($\mu$m) | 50 | | 60 | |
| tensile strength at break (kg/mm$^2$) | 1.47 | 1.42 | 1.10 | 1.16 |
| elongation at break (%) | 12.7 | 13.5 | 15.9 | 16.5 |
| tear strength (g) | 12.5 | 12.3 | 15.0 | 14.5 |

[1], [2], [5], [6], [7], [8], [9], [11], [12], and [13] are the same as those described for Table 1 and Table 2.
[14]Mark1413: benzophenon based ultraviolet absorbent, a product of ASAHI DENKA Co., Ltd.

Where two values are shown side-by-side in Quality of the film of Table 3 of tensile strength at break, elongation at break and tear strength, the left value shows the value obtained in the longitudinal direction and the right value shows the value obtained in the transverse direction.

While the present invention has been described by means of specific embodiments, it will be understood that modifications may be made without departing from the spirit of the invention. The scope of the invention is not considered to be limited by the description of the invention set forth in the specification and examples, but rather defined by the following claims.

What is claimed is:

1. A thermoplastic acrylic resin brittle film which consists of one or two layers and in which no vinyl chloride resin is used and which has a tensile strength at break of 1.0 to 3.0 kg/mm$^2$, a tear strength of 3.0 to 20.0 g and an elongation at break of 2.0 to 20.0%, and being prepared from a resin composition which comprises (A) 100 parts by weight of a thermoplastic acrylic resin which has an elongation at break of 10 to 180%, (B) 10 to 70 parts by weight of at least one type of filler selected from the group consisting of (a) fused silica filler comprising aggregates of particles having an average diameter of the particles in the range of 5 to 20 $\mu$m and diameters of the particles in the range of 0.5 to 100 $\mu$m, (b) aluminum hydroxide comprising aggregates of particles having an average diameter of the particles in the range of 1 to 20 $\mu$m and diameters of the particles in the range of 0.2 to 50 $\mu$m, (c) barium sulfate comprising aggregates of particles having an average diameter of the particles in the range of 1 to 20 $\mu$m and diameters of the particles in the range of 0.2 to 50 $\mu$m, and (d) calcium carbonate comprising aggregates of particles having an average diameter of the particles in the range of 0.5 to 20 $\mu$m and diameters of the particles in the range of 0.1 to 50 $\mu$m, and (C) 0 to 30 parts by weight of a plasticizer.

2. A thermoplastic acrylic resin brittle film according to claim 1, which has a tear strength of 5.0 to 17.0 g.

3. A thermoplastic acrylic resin brittle film according to claim 1, which has a thickness of 20 to 80 $\mu$m.

4. A thermoplastic acrylic resin brittle film according to claim 1, wherein said thermoplastic acrylic resin has an elongation at break of 20 to 140%.

5. A thermoplastic acrylic resin brittle film according to claim 1, wherein said filler is fused silica.

6. A thermoplastic acrylic resin brittle film according to claim 1, which consists of two layers.

7. A thermoplastic acrylic resin brittle film according to claim 6, which has a tear strength of 5.0 to 17.0 g.

8. A thermoplastic acrylic resin brittle film according to claim 6, which has a thickness of 20 to 80 $\mu$m.

9. A thermoplastic acrylic resin brittle film according to claim 6, wherein said thermoplastic acrylic resin has an elongation at break of 20 to 140%.

10. A thermoplastic acrylic resin brittle film according to claim 6, wherein said filler is fused silica.

11. A thermoplastic acrylic resin brittle film according to claim 1, wherein said resin composition comprises additionally a coloring agent.

12. A thermoplastic acrylic resin brittle film according to claim 6, wherein said resin composition comprises additionally a coloring agent.

13. A thermoplastic acrylic resin brittle film according to claim 12, wherein the coloring agent is different in the two layers.

14. A thermoplastic acrylic resin brittle film according to claim 6, wherein said two layers comprise a surface layer and a lower layer and said surface layer is thinner than said lower layer thereof.

15. A thermoplastic acrylic resin brittle film according to claim 6, further comprising an adhesive layer for affixing the acrylic resin brittle film to a substrate.

16. A thermoplastic acrylic resin brittle film according to claim 1, further comprising an adhesive layer for affixing the acrylic resin brittle film to a substrate.

17. A thermoplastic acrylic resin according to claim 1, containing 0 parts by weight of said plasticizer.

* * * * *